US009396356B2

(12) United States Patent
Pereira

(10) Patent No.: US 9,396,356 B2
(45) Date of Patent: Jul. 19, 2016

(54) ENDORSEMENT OF UNMODIFIED PHOTOGRAPHS USING WATERMARKS

(71) Applicant: Kevin Pereira, Perth (AU)

(72) Inventor: Kevin Pereira, Perth (AU)

(*) Notice: Subject to any disclaimer, the term of this patent is extended or adjusted under 35 U.S.C. 154(b) by 20 days.

(21) Appl. No.: 14/494,614

(22) Filed: Sep. 24, 2014

(65) Prior Publication Data
US 2016/0085994 A1 Mar. 24, 2016

(51) Int. Cl.
G06F 21/64 (2013.01)
G06F 21/31 (2013.01)
G06F 21/62 (2013.01)

(52) U.S. Cl.
CPC .............. *G06F 21/645* (2013.01); *G06F 21/31* (2013.01); *G06F 21/6272* (2013.01)

(58) Field of Classification Search
None
See application file for complete search history.

(56) References Cited

U.S. PATENT DOCUMENTS

| | | | | |
|---|---|---|---|---|
| 6,628,417 B1* | 9/2003 | Naito | ..................... | G06F 3/1208 358/1.15 |
| 8,209,608 B1* | 6/2012 | Linyard | ................ | G06F 17/211 715/705 |
| 8,825,515 B1* | 9/2014 | Hanson | .................. | G06Q 50/01 705/7.32 |
| 2012/0116559 A1* | 5/2012 | Davis | ...................... | G06F 3/002 700/94 |
| 2013/0305287 A1* | 11/2013 | Wong | ................... | H04N 21/482 725/42 |
| 2013/0311329 A1* | 11/2013 | Knudson | ................ | G06Q 50/01 705/26.9 |
| 2014/0049653 A1* | 2/2014 | Leonard | ................ | G06T 1/0042 348/207.1 |
| 2014/0375828 A1* | 12/2014 | Miller | ................ | H04N 1/00289 348/207.11 |
| 2015/0036004 A1* | 2/2015 | Harwell | ................ | G06F 3/0481 348/207.11 |
| 2015/0143530 A1* | 5/2015 | Lee | ........................ | H04L 65/403 726/26 |
| 2015/0215492 A1* | 7/2015 | De Vuono | .......... | H04N 1/32144 382/100 |

* cited by examiner

*Primary Examiner* — Benjamin Lanier
(74) *Attorney, Agent, or Firm* — Raj Abhyanker, P.C.

(57) ABSTRACT

A method, device and system of a watermarking server authenticates a user in a watermarking application of a mobile device as the user of a trusted third-party communication platform. The method determines whether a photograph is captured using a front camera or a back camera of the mobile device. The method assigns a unique identifier to the photograph so that the photograph is referenceable using the unique identifier, in case of post-modification by at least one of the user and other users of the trusted third-party communication platform. The method generates a watermark applicable to the photograph, and generates a trusted image based on the photograph by appending the watermark and the unique identifier to the photograph using a processor and a memory of the watermarking server. The method automatically posts the trusted image to the trusted third-party communication platform.

17 Claims, 7 Drawing Sheets

| USER 110 | PHOTOGRAPH 118 | UNIQUE IDENTIFIER 124 | TRUSTED IMAGE 120 | METADATA 204 | TRUSTED THIRD-PARTY COMMUNICATION PLATFORM 106 | CAPTION 128 | HASH TAG 126 | TIMESTAMP 400 | VERIFICATION COUNT 402 |
|---|---|---|---|---|---|---|---|---|---|
| JDoe27 |  | A2R1cV |  | 33.86°S, 151.21°E | TweetBook | My cat | #REALIE | 07/01/2015 11:02 | 17 |
| BStevens13 |  | G7BfyX |  | 37.20°N, 121.53°W | FaceLink | ME! | #REALIE | 07/01/2015 12:47 | 2 |
| ... | ... | ... | ... | ... | ... | ... | ... | ... | ... |

TABLE VIEW
450

ENDORSEMENT OF UNMODIFIED PHOTOGRAPHS USING WATERMARKS

FIELD OF TECHNOLOGY

This disclosure relates generally to the technical fields of communications and, more particularly, to endorsement of unmodified photographs using watermarks.

BACKGROUND

A mobile device may include a camera that allows a user to capture an image. The image may be communicated from the mobile device to an external website (e.g., a trusted third-party communication platform such as Twitter®, Facebook®, and/or Pinterest®). The image may be modified by the user and/or other users of the external website. For example, text may be added, colors may be changed, new objects added in the image, and/or aspects of the image deleted. Therefore, it may be difficult for a user of the external website to determine if the image has been modified.

SUMMARY

Disclosed are a method, a device and/or a system for the endorsement of unmodified photographs using watermarks, according to one embodiment.

In one aspect, a method of a watermarking server includes authenticating a user in a watermarking application of a mobile device as the user of a trusted third-party communication platform. The method determines that a photograph is captured using at least one of a front camera and a back camera of the mobile device. The method further assigns a unique identifier to the photograph, so that the photograph is referenceable using the unique identifier, in case of post-modification by at least one of the user and other users of the trusted third-party communication platform. The method generates a watermark applicable to the photograph, and further generates a trusted image based on the photograph by appending the watermark and the unique identifier to the photograph using a processor and a memory of the watermarking server. The method automatically posts the trusted image to the trusted third-party communication platform.

The method may associate a caption posted by the user and/or other users of the trusted third-party communication platform with the photograph and/or the trusted image. The method may include generating a hashtag related to the caption posted by the user with the photograph and/or the trusted image, and may apply the hashtag to the caption posted by the user with the photograph and/or the trusted image. The trusted image posted in the trusted third-party communication platform may appear along with the watermark and/or the unique identifier. The method may include automatically hash-tagging each subsequent caption added to the trusted image in the trusted third-party communication platform. The method may generate a hyperlink to the photograph when the trusted image is displayed on the trusted third-party communication platform to users of the trusted third-party communication platform. The method may include permitting users of the trusted third-party communication platform viewing the trusted image to compare a current display of the trusted image in the third-party communication platform with the photograph through the hyperlink. The current display may be a derivative image of the trusted image, an alteration of the trusted image, a transformation of the trusted image, and/or a duplication of the trusted image. The photograph may be remotely stored on a storage device associated with the watermarking server. Users of the trusted third-party communication platform may be presented with metadata associated with the photograph through the hyperlink. The metadata associated with the photograph may include a GPS coordinate, a geographic location, a date, a time, and/or an Exif tag. The trusted communication platform may be a short-messaging-service, a website, a mobile application, and/or an online social network.

In another aspect, a computer server includes a processor and a memory having non-transitory instructions stored thereon that when executed cause the computer server to generate a trusted image based on a captured image provided by a user. The captured image is referenceable through a unique identifier in case of post-modification by other users of an external website using the processor and the memory of the computer server. The computer server generates a watermark applicable to the captured image and appends the watermark and a unique identifier to the captured image. The computer server automatically posts the trusted image to the external website, associates a caption posted by the user and/or other users of the external website with the captured image and the trusted image. The computer server generates a hashtag related to the caption posted by the user with the captured image and the trusted image, and applies the hashtag to the caption posted by the user with the captured image and the trusted image.

The computer server may further include authenticating the user in a watermarking application of a mobile device as the user of the external website, and executing a video sequence when the user is determined to be unfamiliar with the watermarking application. The external website may be a short-messaging-service and an online social network.

In yet another aspect, a method of a watermarking server assigns a unique identifier to a photograph. The method generates a trusted image based on the photograph, using a processor and a memory of the watermarking server, so that the photograph is referenceable through the unique identifier in case of post-modification by users of a trusted third-party communication platform. The method generates a watermark applicable to the photograph, appends the watermark and the unique identifier to the photograph, and automatically posts the trusted image to the trusted third-party communication platform.

The methods and systems disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

A method, apparatus, and system of endorsement of unmodified photographs using watermarks are disclosed. In the following description, for the purposes of explanation, numerous specific details are set forth in order to provide a thorough understanding of the various embodiments. It will be evident, however, to one skilled in the art that the various embodiments may be practiced without these specific details.

Figure 1:
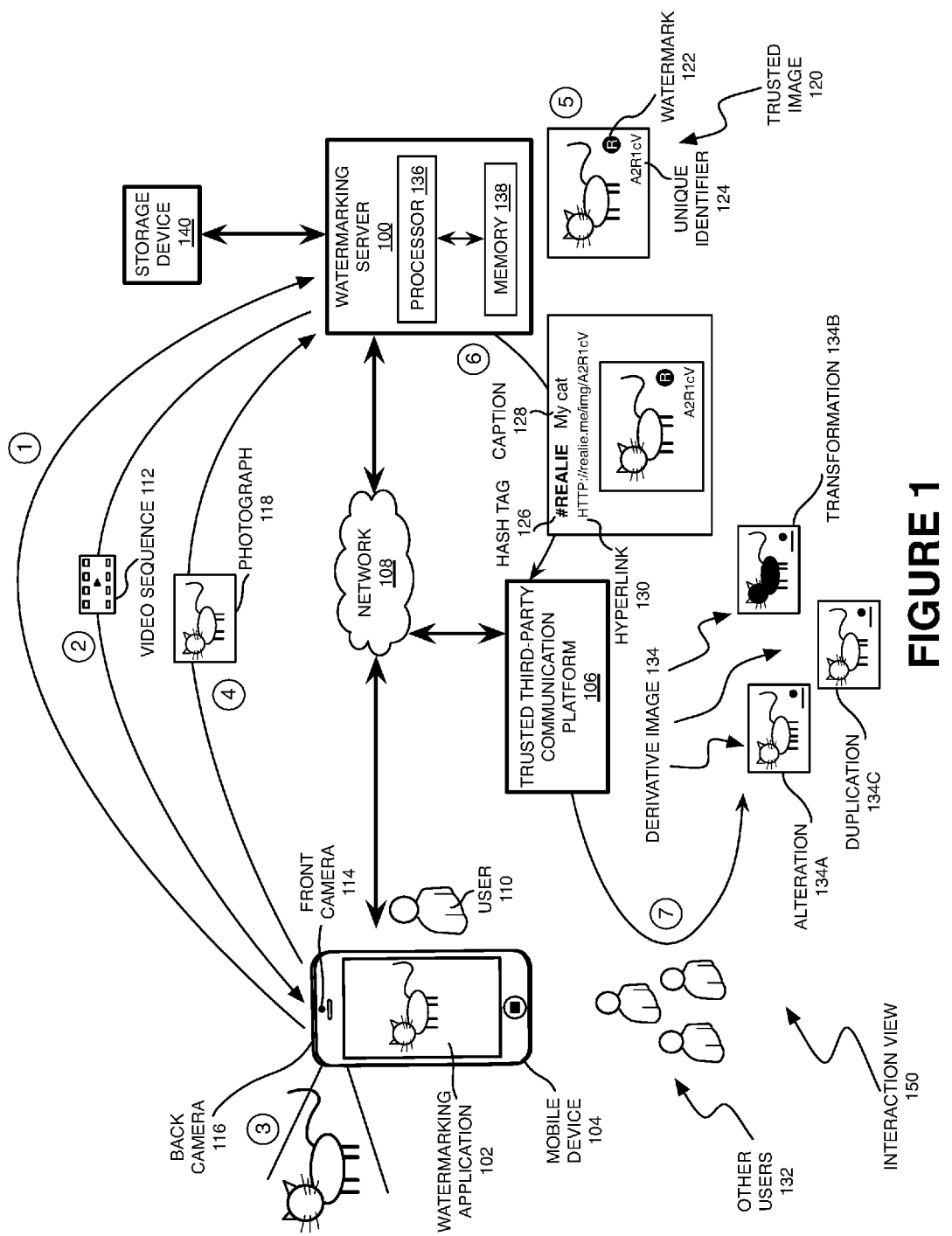
FIG. 1 is an interaction view between a watermarking application of a mobile device, a watermarking server, and a trusted third-party communication platform in a scenario of a user capturing a photograph and posting a trusted image, according to one embodiment.

FIG. 1 is an interaction view 150 between a watermarking application 102 of a mobile device 104, a watermarking server 100, and a trusted third-party communication platform 106 in a scenario of a user 110 capturing a photograph 118 and posting a trusted image 120, according to one embodiment. Particularly, FIG. 1 shows the watermarking server 100, the watermarking application 102, the mobile device 104, the trusted third-party communication platform 106, a network 108, the user 110, a video sequence 112, a front camera 114, a back camera 116, the photograph 118, the trusted image 120, a watermark 122, a unique identifier 124, a hashtag 126, a caption 128, a hyperlink 130, other users 132 of the trusted third-party communication platform 106, a derivative image 134, an alteration 134A of the trusted image 120, a transformation 134B of the trusted image 120, a duplication 134C of the trusted image 120, a processor 136, a memory 138, and a storage device 140.

The watermarking server 100 may be a computing system (e.g., a laptop, a desktop, a mobile device) and/or computer program that manages access to a centralized resource or service, such as applying a watermark 122 to an image, in a network 108. The watermarking application 102 may be a program or piece of software designed to facilitate the application of visual design which may be faint and/or transparent to an image or document. The mobile device 104 may be a smartphone, a camera phone, a personal digital assistant, a cellular telephone, a laptop, and/or any other similar mobile computing device. See, for example, mobile device 750 in FIG. 7. The trusted third-party communication platform 106 may be a computer based communication system operated, controlled, and/or owned by a third party, which may have been deemed reliable.

The network 108 may be a telecommunications network 108 that allows computers to exchange data. The user 110 may be a person or a proxy who uses, operates, or interacts with a computer based system or service. The video sequence 112 may be a digital recording of moving images. In one embodiment, the video sequence 112 may be an instructional animation. The front camera 114 may be camera located on the same face of the mobile device 104 as the primary screen. The back camera 116 may be a camera located on the opposite face of the mobile device 104 as the primary screen.

The photograph 118, or captured image, may be an image created by light interacting with a light-sensitive surface, such as film, a CCD, a CMOS chip, and/or any other light-sensitive surface. The trusted image 120 may be an image in which a viewer may have confidence is a unmodified photograph 118. The watermark 122 may be a visual design, sometimes faint or transparent, which may be applied to a portion of an image without overly obscuring the original contents of the image.

The unique identifier 124 may be a sequence of alphanumeric characters which uniquely identify a particular photograph 118. In various embodiments, the unique identifier 124 may be based in part on the identity of the user 110 operating the watermarking application 102. The hashtag 126 may be a word or phrase preceded by a hash or pound sign (#). In another embodiment, the hashtag 126 may be some other form of metadata tag. The caption 128 may be a title or brief description which may be included with an image or article.

The hyperlink 130 may be link from a file or document to another location or file, sometimes activated by clicking or tapping on a highlighted word or image on a computer screen. The other users 132 of the trusted third-party communication platform 106 may be users of the trusted third-party communication platform 106 who are not the user 110 of the watermarking application 102.

The derivative image 134 of the trusted image 120 may be an image which has been derived, at least in part, from the trusted image 120. The alteration 134A of the trusted image 120 may be a variation of the trusted image 120 in which at least a portion has been edited (e.g. added, removed, rearranged, distorted, etc.). The transformation 134B of the trusted image 120 may be a variation of the trusted image 120 which has been exposed, at least in part, to a graphical operation (e.g. filtering, color space manipulation, color correction, etc.). The duplication 134C of the trusted image 120 may be a copy of the trusted image 120.

The processor 136 may be a central processor unit (CPU) that may carry out the instructions of a computer program by performing the basic arithmetical, logical, and/or input/output operations of a computing system. The memory 138 may be physical devices used to store programs (sequences of instructions) and/or data (e.g. program state information) on a temporary and/or permanent basis for use in a computer or other digital electronic device. The storage device 140 may be a piece of computer equipment on which information can be stored, including but not limited to, hard drives, optical discs, solid state memory, a file server, a database, and/or any other form of temporary or permanent data storage.

The watermarking server 100 is communicatively coupled with the mobile device 104 and the trusted third-party communication platform 106 through a network 108. The watermarking server 100 may include a processor 136 communicatively coupled with a memory 138. The watermarking server 100 is communicatively coupled to the storage device 140.

FIG. 1 illustrates operations 'circle 1' through 'circle 7'. First, in 'circle 1', the user 110 is authenticated in the watermarking application 102 of the mobile device 104. The user 110 is also a user 110 of the trusted third-party communication platform 106. In 'circle 2', a video sequence 112 is executed when the user 110 is determined to be unfamiliar with the watermarking application 102. In one embodiment, the video sequence 112 may be streamed from the watermarking server 100. In another embodiment, the video sequence 112 may be stored within the watermarking application 102. As an option, the user 110 may cancel the execution of the video sequence 112, in accordance with one embodiment.

In 'circle 3', the user 110 captures a photograph 118 using the back camera 116 of the mobile device 104. The user 110 may also capture a photograph 118 using the front camera 114. As shown in FIG. 1, the user 110 has captured a photograph 118 of a cat. In 'circle 4', the watermarking application 102 sends the photograph 118, and at least a caption 128 provided by the user 110 to the watermarking server 100. In one embodiment, the watermarking application 102 may also send a hashtag 126 either generated by the watermarking application 102 or provided by the user.

In 'circle 5', the watermarking server 100 assigns a unique identifier 124 to the photograph 118, and generates a watermark 122. The watermarking server 100 generates a trusted image 120 by appending the watermark 122 and the unique identifier 124 to the photograph 118. In 'circle 6', the watermarking server 100 automatically posts the trusted image 120 to the trusted third-party communication platform 106, along with the hashtag 126, the caption 128, and a hyperlink 130 associated with the photograph 118.

Finally, 'Circle 7' illustrates the scenario where other users 132 of the trusted third-party communication platform 106 have used the trusted image 120 to create a derivative image 134. Examples of a derivative image 134 include, but are not limited to, an alteration 134A of the trusted image 120, a transformation 134B of the trusted image 120, and a duplication 134C of the trusted image 120.

In one embodiment, a method of a watermarking server 100 includes authenticating a user 110 in a watermarking application 102 of a mobile device 104 as the user 110 of a trusted third-party communication platform 106. The method determines that a photograph 118 is captured using at least one of a front camera 114 and a back camera 116 of the mobile device 104. The method further assigns a unique identifier 124 to the photograph 118, so that the photograph 118 is referenceable using the unique identifier 124, in case of post-modification by at least one of the user 110 and other users 132 of the trusted third-party communication platform 106.

The method generates a watermark 122 applicable to the photograph 118, and further generates a trusted image 120 based on the photograph 118 by appending the watermark 122 and the unique identifier 124 to the photograph 118 using a processor 136 and a memory 138 of the watermarking server 100. The method automatically posts the trusted image 120 to the trusted third-party communication platform 106.

The method may associate a caption 128 posted by the user 110 and/or other users 132 of the trusted third-party communication platform 106 with the photograph 118 and/or the trusted image 120. The method may include generating a hashtag 126 related to the caption 128 posted by the user 110 with the photograph 118 and/or the trusted image 120, and may apply the hashtag 126 to the caption 128 posted by the user 110 with the photograph 118 and/or the trusted image 120.

The trusted image 120 posted in the trusted third-party communication platform 106 may appear along with the watermark 122 and/or the unique identifier 124. The method may include automatically hash-tagging each subsequent caption 128 added to the trusted image 120 in the trusted third-party communication platform 106. The method may generate a hyperlink 130 to the photograph 118 when the trusted image 120 is displayed on the trusted third-party communication platform 106 to users of the trusted third-party communication platform 106.

Figure 2:
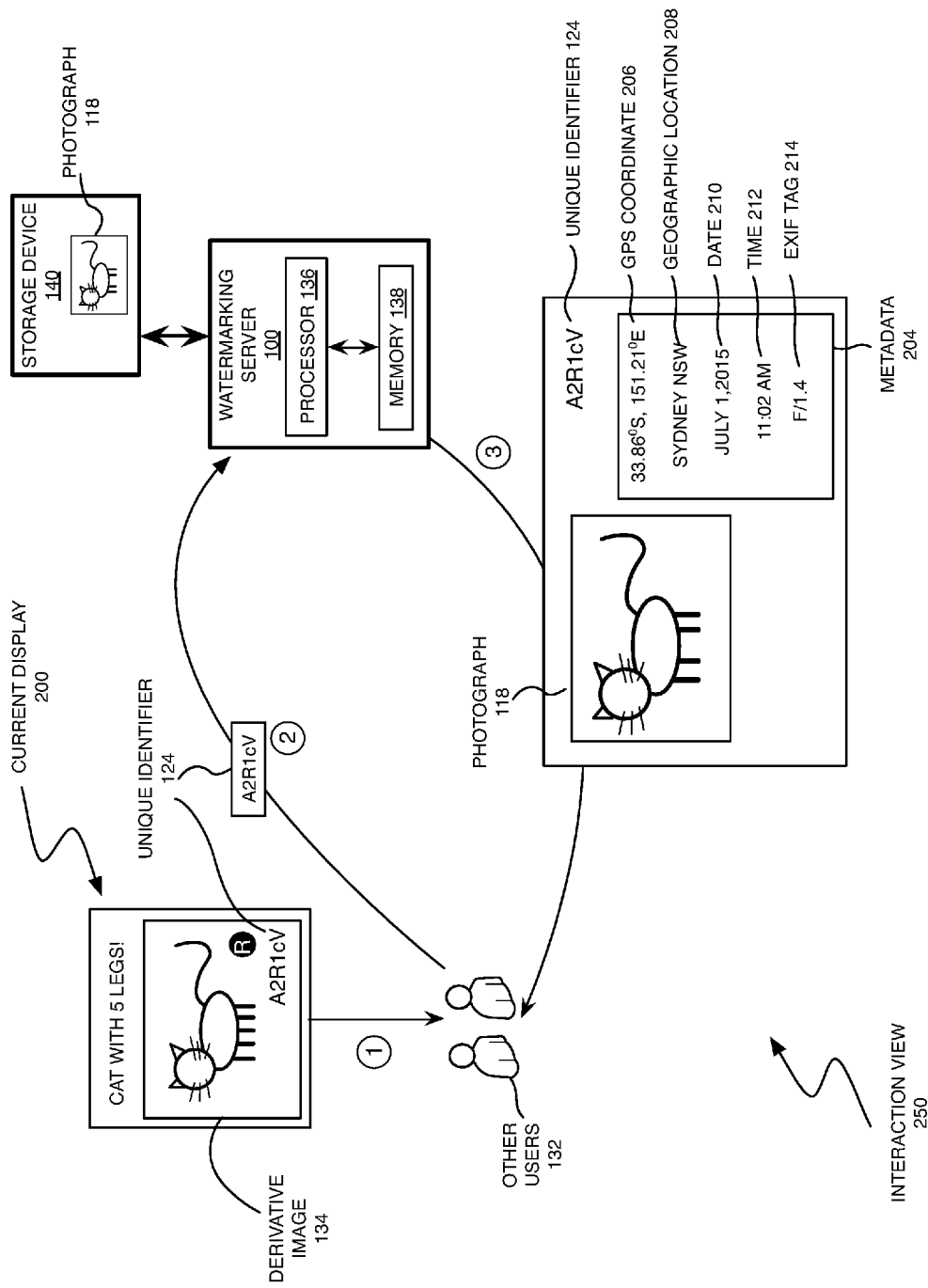
FIG. 2 is an interaction view between users of the trusted third-party communication platform and the watermarking server of FIG. 1 in a scenario of a current display of the trusted image being compared to the photograph, according to one environment.

FIG. 2 is an interaction view 250 between users of the trusted third-party communication platform 106 and the watermarking server 100 of FIG. 1 in a scenario of a current display 200 of the trusted image 120 being compared to the photograph 118, according to one environment. Particularly, FIG. 2 shows a current display 200, metadata 204, a GPS coordinate 206, a geographic location 208, a date 210, a time 212, and an Exif tag 214, in addition to the derivative image 134, the other users 132, the unique identifier 124, the watermarking server 100, the photograph 118, and the storage device 140 of FIG. 1.

The current display 200 may be visual presentation (e.g. webpage, message, posting, etc.) including some form of the trusted image 120, whether in it's original state or post-modification. The metadata 204 may be a set of data that describes and/or gives information about other data. The GPS coordinate 206 may be a set of latitude and longitude values which identify a geographic location. The geographic location 208 may be a point on, above, or below the surface of the Earth. The date 210 may be the calendar date when the photograph 118 was taken. The time 212 may be the time the photograph 118 was taken. The Exif tag 214 may be one or more pieces of metadata attached to a digital image file which may conform to a standard.

FIG. 2 illustrates operations 'circle 1' through 'circle 3'. First, in 'circle 1', a current display 200 of a derivative image 134 has been presented to other users 132 of the trusted third-party communication platform 106. For example, as shown, the trusted image 120 of FIG. 1 has been altered so the cat has five legs. The other users 132 are understandably skeptical. In 'circle 2', the other uses request the original photograph 118 from the watermarking server 100. As shown, this is done by submitting the unique identifier 124 to the watermarking server 100. This may also be done by activating the hyperlink 130 which was generated by the watermarking server 100 when the trusted image 120 was automatically posted in 'circle 6' of FIG. 1. In response, the watermarking server 100 retrieves the photograph 118 from a storage device 140.

In 'circle 3', the watermarking server 100 presents to the other users 132 a display (e.g. a web page, a view within a mobile application 304, etc.) which comprises the photograph 118, the unique identifier 124, and metadata 204 associated with the photograph 118. As shown, the metadata 204 may include a GPS coordinate 206, a geographic location 208, a date 210, a time 212, and an Exif tag 214. Seeing this, the other users 132 may know for sure that the image of the five legged cat was indeed an alteration 134A of the trusted image 120.

The method of the watermarking server 100 may include permitting users of the trusted third-party communication platform 106 viewing the trusted image 120 to compare a current display 200 of the trusted image 120 in the trusted third-party communication platform 106 with the photograph 118 through the hyperlink 130. The current display 200 may be a derivative image 134 of the trusted image 120, an alteration 134A of the trusted image 120, a transformation 134B of the trusted image 120, and/or a duplication 134C of the trusted image 120, in accordance with one embodiment.

The photograph 118 may be remotely stored on a storage device 140 associated with the watermarking server 100. Users of the trusted third-party communication platform 106 may be presented with metadata 204 associated with the photograph 118 through the hyperlink 130. The metadata 204 associated with the photograph 118 may include a GPS coordinate 206, a geographic location 208, a date 210, a time 212, and/or an Exif tag 214. The trusted communication platform may be a short-messaging-service 300, a website 302, a mobile application 304, and/or an online social network 306.

Figure 3:
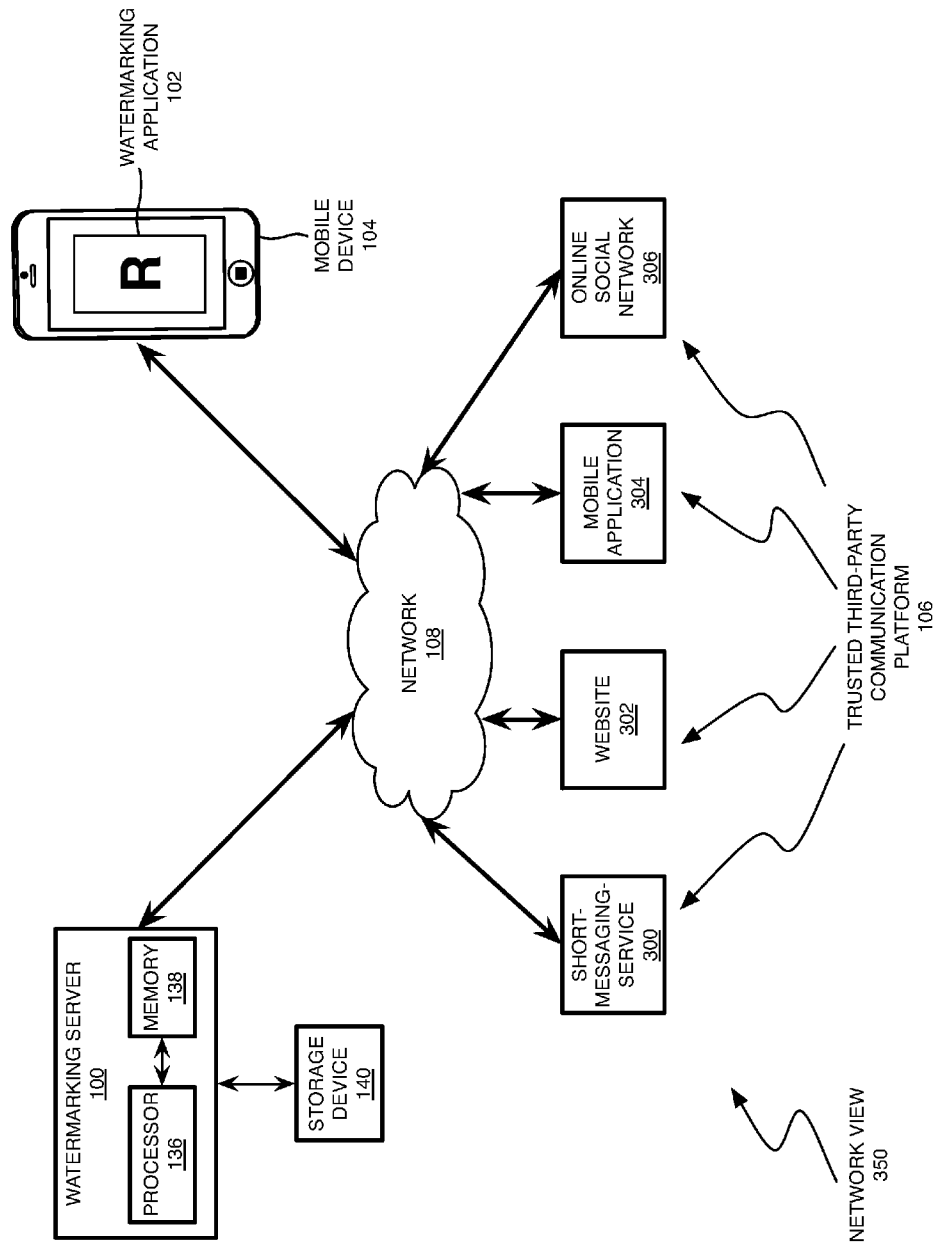
FIG. 3 is a network view of the watermarking server of FIG. 1 communicatively coupled to a storage device, communicating with the mobile device and at least one trusted third-party communication platform, according to one embodiment.

FIG. 3 is a network 108 view 350 of the watermarking server 100 of FIG. 1 communicatively coupled to a storage device 140, communicating with the mobile device 104 and at least one trusted third-party communication platform 106, according to one embodiment. Particularly, FIG. 3 shows a short-messaging-service 300, a website 302, a mobile application 304, an online social network 306, in addition to the watermarking server 100, the processor 136, the memory 138, the network 108, the mobile device 104, the watermarking application 102, and storage device 140 of FIG. 1.

The short-messaging-service 300 may be a text messaging service component of phone, web, or mobile communication systems. The website 302 may be a location connected to the Internet that maintains one or more webpages, hosted on at least one web server, accessible via a network 108. The website 302 may be an external website. An external website may be a website 302 which is served from a web domain that is different than that used by the watermarking server 100.

The mobile application 304 may be an application designed to be executed on a mobile computing device. The online social network 306 may be a dedicated website or other application which enables users to communicate with each other by posting information, comments, messaging, images, and/or other data. The short-messaging-service 300, the website 302, the mobile application 304, and the online social network 306 are all examples of a trusted third-party communication platform 106.

The watermarking server 100 is communicatively coupled with the mobile device 104, and at least one trusted third-party communication platform 106, through a network 108. Examples of trusted third-party communication platforms 106 which the watermarking server 100 may be communicatively coupled to include, but are not limited to, a short-messaging-service 300, a website 302, a mobile application 304, and an online social network 306. The watermarking server 100 is also communicatively coupled to a storage device 140. The watermarking server 100 may include a processor 136 communicatively coupled to a memory 138.

In another embodiment, a computer server includes a processor 136 and a memory 138 having non-transitory instructions stored thereon that when executed cause the computer server to generate a trusted image 120 based on a captured image provided by a user. The captured image is referenceable through a unique identifier 124 in case of post-modification by other users 132 of an external website using the processor 136 and the memory 138 of the computer server. The computer server generates a watermark 122 applicable to the captured image and appends the watermark 122 and a unique identifier 124 to the captured image.

The computer server automatically posts the trusted image 120 to the external website, associates a caption 128 posted by the user 110 and/or other users 132 of the external website with the captured image and the trusted image 120. The computer server generates a hashtag 126 related to the caption 128 posted by the user 110 with the captured image and the trusted image 120, and applies the hashtag 126 to the caption 128 posted by the user 110 with the captured image and the trusted image 120.

The computer server may further include authenticating the user 110 in a watermarking application 102 of a mobile device 104 as the user 110 of the external website, and executing a video sequence 112 when the user 110 is determined to be unfamiliar with the watermarking application 102. The external website may be a short-messaging-service 300 and an online social network 306.

Figure 4:
FIG. 4 is a table view of the user, the photograph, the unique identifier, the trusted image, and associated data, according to one embodiment.
Figure 4:
Figure 4:
Figure 4:
Figure 4:

FIG. 4 is a table view 450 of the user, the photograph 118, the unique identifier 124, the trusted image 120, and associated data, according to one embodiment. Particularly, FIG. 4 includes a timestamp 400, and a verification count 402, in addition to the metadata 204, the trusted third-party communication platform 106, the caption 128, and the hashtag 126.

The timestamp 400 may be a time and/or date when the photograph 118 was received by the watermarking server 100. The verification count 402 may be a tally of the number of times the photograph 118 has been accessed using the hyperlink 130 and/or the unique identifier 124. This information may be used as an indicator of popularity, or an indicator the photograph 118 depicts something whose veracity is questioned by a number of people.

Figure 5:
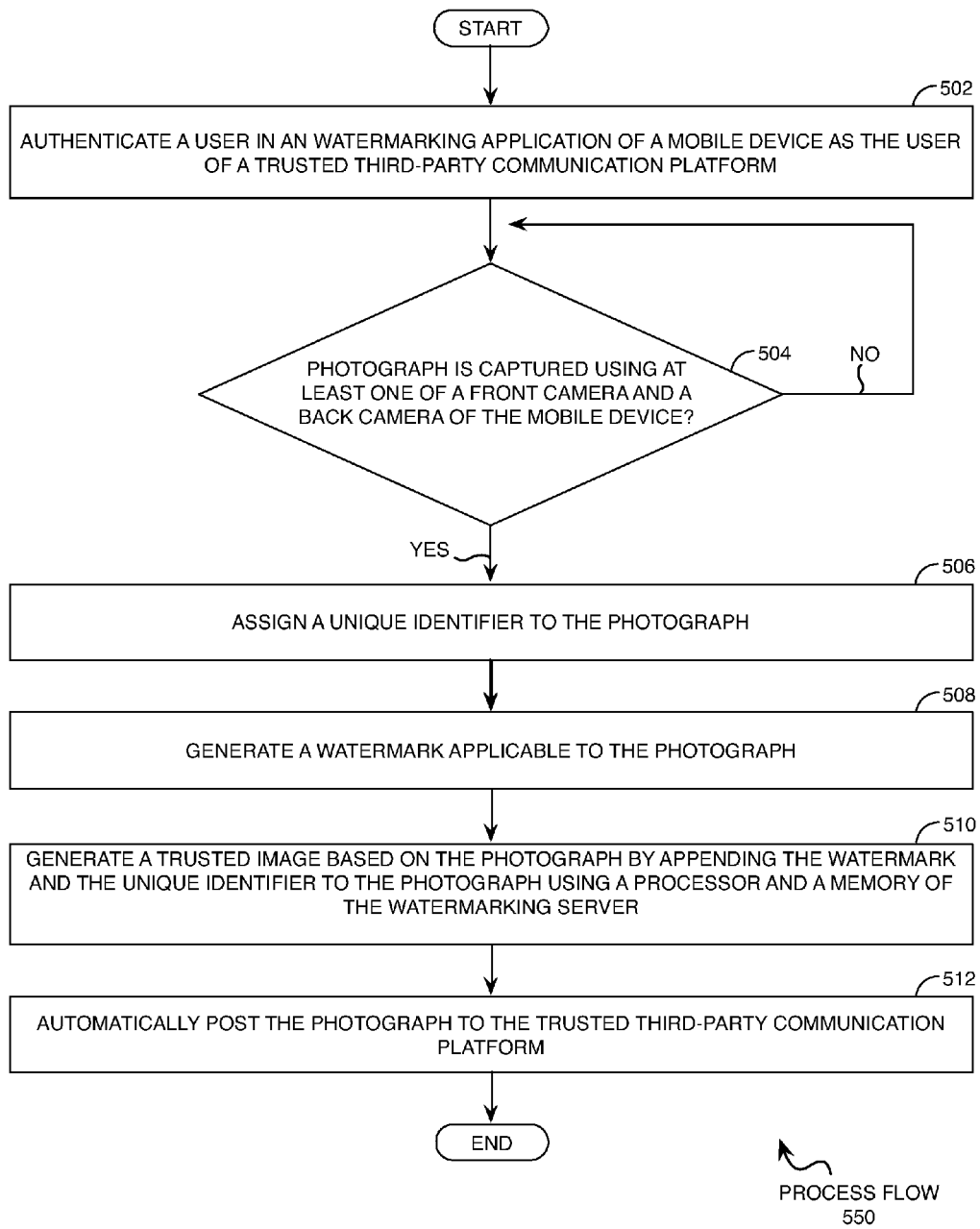
FIG. 5 is a process flow to generate a trusted image based on a photograph, according to one embodiment.

FIG. 5 is a process flow 550 to generate a trusted image 120 based on a photograph 118, according to one embodiment. In operation 502, a user 110 may be authenticated in a watermarking application 102 of a mobile device 104 as the user 110 of a trusted third-party communication platform 106. In operation 504, it may be determined whether a photograph 118 is captured using at least one of a front camera 114 and a back camera 116 of the mobile device 104. A loop pattern may be entered until a photograph 118 is captured.

When the photograph 118 is captured, a unique identifier 124 may be assigned to the photograph 118. See operation 506. This may be done so the photograph 118 may be referenceable using the unique identifier 124, in case of post-modification. In operation 508, a watermark 122 applicable to the photograph 118 may be generated.

Next, in operation 510, a trusted image 120 may be generated based on the photograph 118 by appending the watermark 122 and the unique identifier 124 to the photograph 118 using a processor 136 and a memory 138 of the watermarking server 100. Finally, in operation 512, the trusted image 120 may be automatically posted to the trusted third-party communication platform 106.

Figure 6:
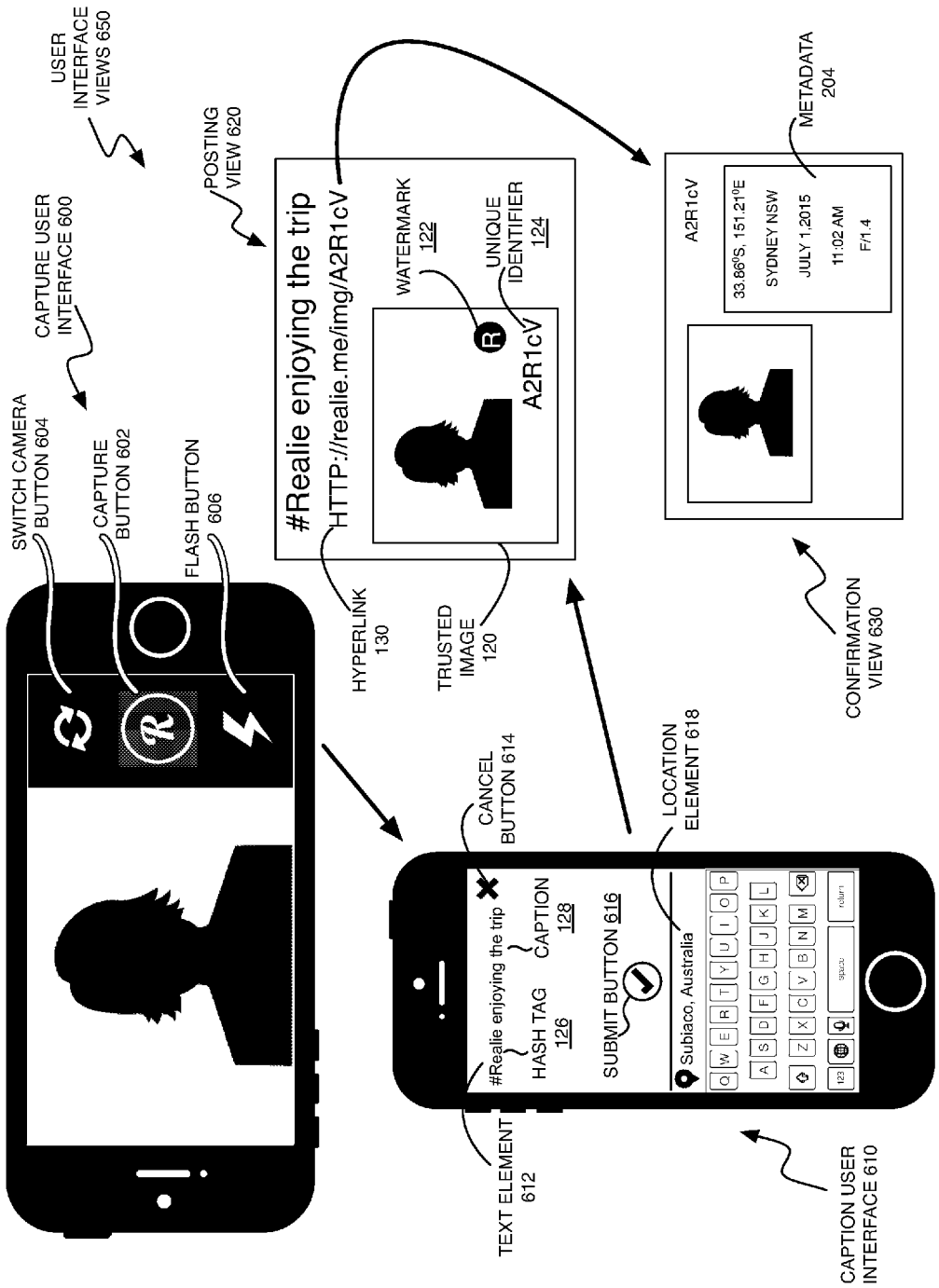
FIG. 6 is a collection of user interface views depicting the capture of a photograph, the posting of a trusted image, and the referencing of the photograph using a unique identifier, according to one embodiment.

FIG. 6 is a collection of user interface views 650 depicting the capture of a photograph 118, the posting of a trusted image 120, and the referencing of the photograph 118 using a unique identifier 124, according to one embodiment. Particularly, FIG. 6 shows a capture user interface 600, a capture button 602, a switch camera button 604, a flash button 606, a caption user interface 610, a text element 612, a cancel button 614, a submit button 616, a location element 618, a posting view 620, a confirmation view 630, in addition to the hashtag 126, the caption 128, the hyperlink 130, the watermark 122, the unique identifier 124, and the trusted image 120 of FIG. 1, and the metadata 204 of FIG. 2.

The capture user interface 600 may allow the user 110 to take a photograph 118 using the front camera 114 or back camera 116 of the mobile device 104. The capture button 602 may cause a photograph 118 to be captured. The switch camera button 604 may cause the watermarking application 102 to receive input from the camera opposite to the camera currently active. The flash button 606 may modify the behavior of the flash of the mobile device 104.

The caption user interface 610 may allow the user 110 to write a caption 128 to be associated with the photograph 118 and/or trusted image 120. The text element 612 may allow the user 110 to enter text. The cancel button 614 may cancel the submission of the photograph 118, and return the user 110 to the capture user interface 600. The submit button 616 may submit the photograph 118, the hash tag, the location, and the caption 128 to the watermarking server 100. The location element 618 may allow the user 110 to specify a location to be associated with the posting of the trusted image 120. In some embodiments, the location may be determined automatically using the mobile device 104. In other embodiments, the user 110 may manually enter a location into the location element 618. In still other embodiments, the user 110 may either use an automatically determined location or enter a location manually.

The posting view 620 is a representative depiction of what the watermarking server 100 posts to the trusted third-party communication platform 106. The confirmation view 630 is a representative depiction of what is displayed to other users 132, either in response to activating the hyperlink 130 associated with the trusted image 120, or entering the unique identifier 124 into an interface with the watermarking server 100 (e.g. webpage, mobile application, etc.).

As a specific example, a user 110 may take a photograph 118 of herself by pressing the capture button 602, after which she would be presented with the caption user interface 610. After she enters a caption 128 (e.g. "enjoying the trip") to be added to the hashtag 126 "#Realie", she presses the submit button 616, which causes the photograph 118, the caption 128, and the hashtag 126 to be sent to the watermarking server 100, which automatically posts to a trusted third-party communication platform 106 a posting containing the hashtag 126, the caption 128, a trusted image 120 based upon the photograph 118, and a hyperlink 130 which, if activated, displays a confirmation view 630 showing the original photograph 118 and associated metadata 204. Other users of the trusted third-party communication platform 106 may follow the hyperlink 130 to see for themselves that the trusted image 120 was not manipulated in any way after being captured.

Figure 7:
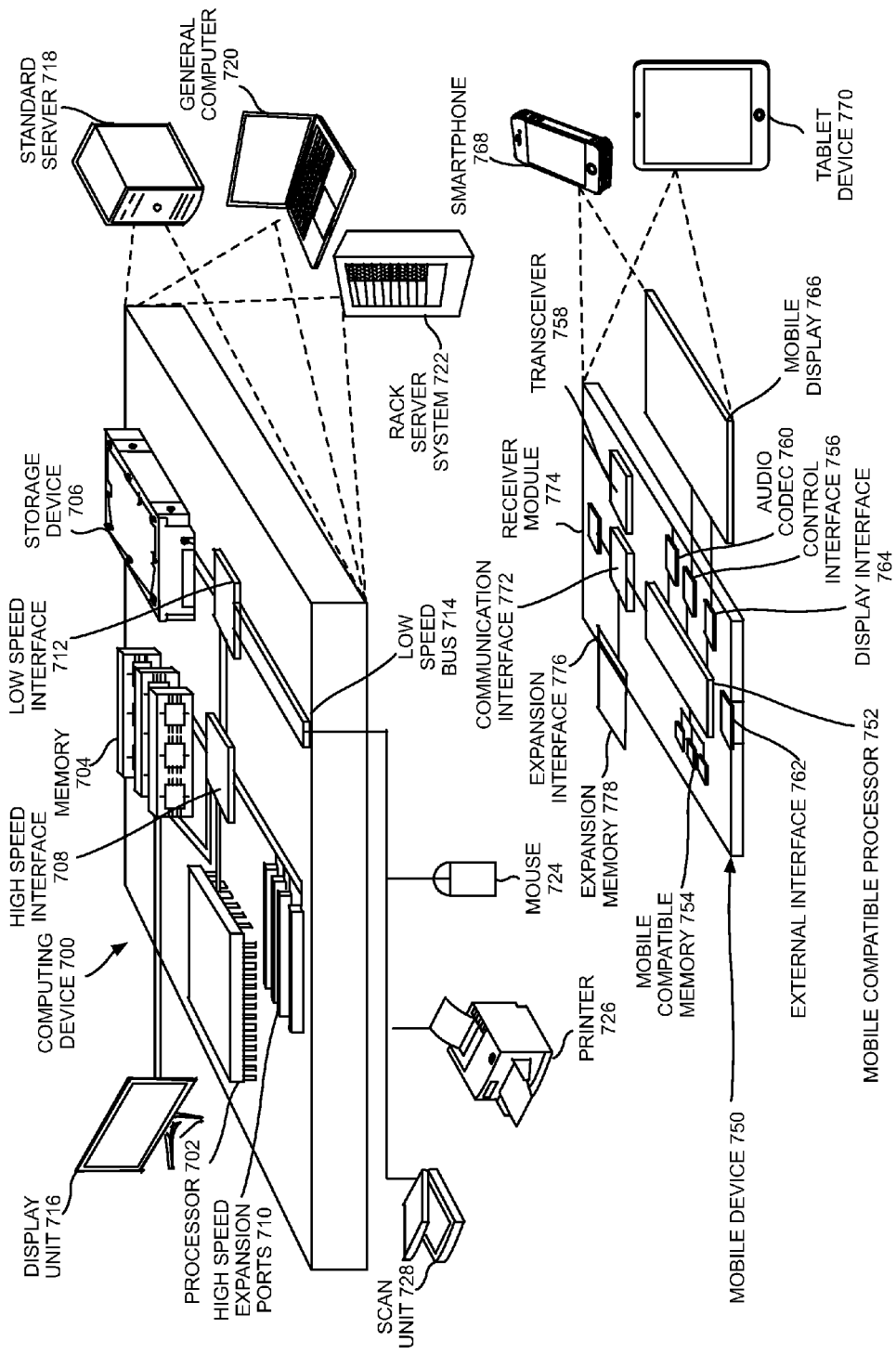
FIG. 7 is a schematic diagram of exemplary data processing devices that can be used to implement the methods and systems disclosed herein, according to one embodiment.

FIG. 7 is a schematic of a computing device 700 and a mobile device 750 that can be used to perform and/or implement any of the embodiments disclosed herein. In one or more embodiments, the watermarking server 100 may be the computing device 700. In addition, the mobile device 104 may be either the computing device 700 or the mobile device 750.

The computing device 700 may represent various forms of digital computers, such as laptops, desktops, workstations, personal digital assistants, servers, blade servers, mainframes, and/or other appropriate computers. The mobile device 750 may represent various forms of mobile devices, such as smartphones, camera phones, personal digital assistants, cellular telephones, and other similar mobile devices. The components shown here, their connections, couples, and relationships, and their functions, are meant to be exemplary only, and are not meant to limit the embodiments described and/or claimed.

The computing device 700 may include a processor 702, a memory 704, a storage device 706, a high speed interface 708 coupled to the memory 704 and a plurality of high speed expansion ports 710, and a low speed interface 712 coupled to a low speed bus 714 and a storage device 706. In one embodiment, each of the components heretofore may be inter-coupled using various buses, and may be mounted on a common motherboard and/or in other manners as appropriate. The processor 702 may process instructions for execution in the computing device 700, including instructions stored in the memory 704 and/or on the storage device 706 to display a graphical information for a GUI on an external input/output device, such as a display unit 716 coupled to the high speed interface 708. In other embodiments, multiple processors and/or multiple buses may be used, as appropriate, along with multiple memories and/or types of memory. Also, a plurality of computing devices 700 may be coupled with, with each device providing portions of the necessary operations (e.g., as a server bank, a group of blade servers, and/or a multi-processor system).

The memory 704 may be coupled to the computing device 700. In one embodiment, the memory 704 may be a volatile memory. In another embodiment, the memory 704 may be a non-volatile memory. The memory 704 may also be another form of computer-readable medium, such as a magnetic and/or an optical disk. The storage device 706 may be capable of providing mass storage for the computing device 700. In one embodiment, the storage device 706 may be comprised of at least one of a floppy disk device, a hard disk device, an optical disk device, a tape device, a flash memory and/or other similar solid state memory device. In another embodiment, the storage device 706 may be an array of the devices in a computer-readable medium previously mentioned heretofore, computer-readable medium, such as, and/or an array of devices, including devices in a storage area network and/or other configurations.

A computer program may be comprised of instructions that, when executed, perform one or more methods, such as those described above. The instructions may be stored in at least one of the memory 704, the storage device 706, a memory coupled to the processor 702, and/or a propagated signal.

The high speed interface 708 may manage bandwidth-intensive operations for the computing device 700, while the low speed interface 712 may manage lower bandwidth-intensive operations. Such allocation of functions is exemplary only. In one embodiment, the high-speed interface 708 may be coupled to at least one of the memory 704, the display unit 716 (e.g., through a graphics processor and/or an accelerator), and to the plurality of high speed expansion ports 710, which may accept various expansion cards. In the embodiment, the low speed interface 712 may be coupled to at least one of the storage device 706 and the low-speed bus 714. The low speed bus 714 may be comprised of a wired and/or wireless communication port (e.g., a Universal Serial Bus ("USB"), a Bluetooth® port, an Ethernet port, and/or a wireless Ethernet port). The low speed bus 714 may also be coupled to at least one of scan unit 728, a printer 726, a keyboard, a mouse 724, and a networking device (e.g., a switch and/or a router) through a network adapter.

The computing device 700 may be implemented in a number of different forms, as shown in the Figure. In one embodiment, the computing device 700 may be implemented as a standard server 718 and/or a group of such servers. In another embodiment, the computing device 700 may be implemented as part of a rack server system 722. In yet another embodiment, the computing device 700 may be implemented as a general computer 720 such as a laptop or desktop computer. Alternatively, a component from the computing device 700 may be combined with another component in a mobile device 750. In one or more embodiments, an entire system may be made up of a plurality of computing devices 700 and/or a plurality of computing devices 700 coupled to a plurality of mobile devices 750.

In one embodiment, the mobile device 750 may comprise at least one of a mobile compatible processor 752, a mobile compatible memory 754, and an input/output device such as a mobile display 766, a communication interface 772, and a transceiver 758, among other components. The mobile device 750 may also be provided with a storage device, such as a microdrive or other device, to provide additional storage. In one embodiment, at least one of the components indicated heretofore are inter-coupled using various buses, and several of the components may be mounted on a common motherboard.

The mobile compatible processor 752 may execute instructions in the mobile device 750, including instructions stored in the mobile compatible memory 754. The mobile compatible processor 752 may be implemented as a chipset of chips that include separate and multiple analog and digital processors. The mobile compatible processor 752 may provide, for example, for coordination of the other components of the mobile device 750, such as control of user interfaces, applications run by the mobile device 750, and wireless communication by the mobile device 750.

The mobile compatible processor 752 may communicate with a user through the control interface 756 and the display interface 764 coupled to a mobile display 766. In one embodiment, the mobile display 766 may be at least one of a Thin-Film-Transistor Liquid Crystal Display ("TFT LCD"), an Organic Light Emitting Diode ("OLED") display, and another appropriate display technology. The display interface 764 may comprise appropriate circuitry for driving the mobile display 766 to present graphical and other information to a user. The control interface 756 may receive commands from a user and convert them for submission to the mobile compatible processor 752. In addition, an external interface 762 may be provide in communication with the mobile compatible processor 752, so as to enable near area communication of the mobile device 750 with other devices. External interface 762 may provide, for example, for wired communication in some embodiments, or for wireless communication in other embodiments, and multiple interfaces may also be used.

The mobile compatible memory 754 may be coupled to the mobile device 750. The mobile compatible memory 754 may be implemented as at least one of a volatile memory and a non-volatile memory. The expansion memory 778 may also be coupled to the mobile device 750 through the expansion interface 776, which may comprise, for example, a Single In Line Memory Module ("SIMM") card interface. The expansion memory 778 may provide extra storage space for the mobile device 750, or may also store an application or other information for the mobile device 750. Specifically, the expansion memory 778 may comprise instructions to carry out the processes described above. The expansion memory 778 may also comprise secure information. For example, the expansion memory 778 may be provided as a security module for the mobile device 750, and may be programmed with instructions that permit secure use of the mobile device 750. In addition, a secure application may be provided on the SIMM card, along with additional information, such as placing identifying information on the SIMM card in a non-hackable manner.

The mobile compatible memory 752 may comprise at least one of a volatile memory (e.g., a flash memory) and a non-volatile memory (e.g., a non-volatile random-access memory ("NVRAM")). In one embodiment, a computer program comprises a set of instructions that, when executed, perform one or more methods. The set of instructions may be stored on at least one of the mobile compatible memory 754, the expansion memory 778, a memory coupled to the mobile compatible processor 752, and a propagated signal that may be received, for example, over the transceiver 758 and/or the external interface 762.

The mobile device 750 may communicate wirelessly through the communication interface 772, which may be comprised of a digital signal processing circuitry. The communication interface 772 may provide for communications using various modes and/or protocols, such as, at least one of: a Global System for Mobile Communications ("GSM") protocol, a Short Message Service ("SMS") protocol, an Enhanced Messaging System ("EMS") protocol, a Multimedia Messaging Service ("MMS") protocol, a Code Division Multiple Access ("CDMA") protocol, Time Division Multiple Access ("TDMA") protocol, a Personal Digital Cellular ("PDC") protocol, a Wideband Code Division Multiple Access ("WCDMA") protocol, a CDMA2000 protocol, and a General Packet Radio Service ("GPRS") protocol. Such communication may occur, for example, through the radio-frequency transceiver 758. In addition, short-range communication may occur, such as using a Bluetooth®, Wi-Fi, and/or other such transceiver. In addition, a GPS ("Global Positioning System") receiver module may provide additional navigation-related and location-related wireless data to the mobile device 750, which may be used as appropriate by a software application running on the mobile device 750.

The mobile device 750 may also communicate audibly using an audio codec 760, which may receive spoken information from a user and convert it to usable digital information. The audio codec 760 may likewise generate audible sound for a user, such as through a speaker (e.g., in a handset of the mobile device 750). Such a sound may comprise a sound from a voice telephone call, a recorded sound (e.g., a voice message, a music files, etc.) and may also include a sound generated by an application operating on the mobile device 750.

The mobile device 750 may be implemented in a number of different forms, as shown in the Figure. In one embodiment, the mobile device 750 may be implemented as a smartphone 768. In another embodiment, the mobile device 750 may be implemented as a personal digital assistant ("PDA"). In yet another embodiment, the mobile device, 750 may be implemented as a tablet device 770.

Various embodiments of the systems and techniques described here can be realized in at least one of a digital electronic circuitry, an integrated circuitry, a specially designed application specific integrated circuits ("ASICs"), a piece of computer hardware, a firmware, a software application, and a combination thereof. These various embodiments can include embodiment in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, and/or code) comprise machine-readable instructions for a programmable processor, and can be implemented in a high-level procedural and/or object-oriented programming language, and/or in assembly/machine language. As used herein, the terms "machine-readable medium" and/or "computer-readable medium" refers to any computer program product, apparatus and/or device (e.g., magnetic discs, optical disks, memory, and/or Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computing device having a display device (e.g., a cathode ray tube ("CRT") and/or liquid crystal display ("LCD") monitor) for displaying information to the user and a keyboard and a mouse 724 by which the user can provide input to the computer. Other kinds of devices can be used to provide for interaction with a user as well; for example, feedback provided to the user can be any form of sensory feedback (e.g., visual feedback, auditory feedback, and/or tactile feed-back) and input from the user can be received in any form, including acoustic, speech, and/or tactile input.

The systems and techniques described here may be implemented in a computing system that comprises at least one of a back end component (e.g., as a data server), a middleware component (e.g., an application server), a front end component (e.g., a client computer having a graphical user interface, and/or a Web browser through which a user can interact with an embodiment of the systems and techniques described here), and a combination thereof. The components of the system may also be coupled through a communication network.

The communication network may comprise at least one of a local area network ("LAN") and a wide area network ("WAN") (e.g., the Internet). The computing system can comprise at least one of a client and a server. In one embodiment, the client and the server are remote from each other and interact through the communication network.

A number of embodiments have been described. Nevertheless, it will be understood that various modifications may be made without departing from the spirit and scope of the claimed invention. In addition, the logic flows depicted in the Figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the Figures may be shown as distinct and communicating with only a few specific structures and not others. The structures may be merged with each other, may perform overlapping functions, and may communicate with other structures not shown to be connected in the Figures. Accordingly, the specification and/or drawings may be regarded in an illustrative rather than a restrictive sense.

What is claimed is:

1. A method of a watermarking server comprising:
   authenticating a user in a watermarking application of a mobile device as the user of a trusted third-party communication platform;
   determining that a photograph is captured using at least one of a front camera and a back camera of the mobile device;
   assigning a unique identifier to the photograph;
   generating a watermark applicable to the photograph;
   generating a trusted image based on the photograph by appending the watermark and the unique identifier to the photograph using a processor and a memory of the watermarking server;
   automatically posting the trusted image to the trusted third-party communication platform;
   wherein the photograph is referenceable using the unique identifier, in case of post-modification by at least one of the user and other users of the trusted third-party communication platform;
   automatically hash-tagging a caption added to the trusted image in the trusted third-party communication platform;
   generating a hyperlink to the photograph when the trusted image is displayed on the trusted third-party communication platform to users of the trusted third-party communication platform; and
   permitting users of the trusted third-party communication platform viewing the trusted image to compare a current display of the trusted image in the third-party communication platform with the photograph through the hyperlink,
   wherein the current display is at least one of a derivative image of the trusted image, an alteration of the trusted image, a transformation of the trusted image, and a duplication of the trusted image, and
   wherein the photograph is remotely stored on a storage device associated with the watermarking server.

2. The method of claim 1 further comprising:
   associating the caption posted by at least one of the user and other users of the trusted third-party communication platform with at least one of the photograph and the trusted image;
   generating a hashtag related to the caption posted by the user with at least one of the photograph and the trusted image; and
   applying the hashtag to the caption posted by the user with at least one of the photograph and the trusted image.

3. The method of claim 1 wherein the trusted image posted in the trusted third-party communication platform to appear along with the watermark and the unique identifier.

4. The method of claim 1 wherein users of the trusted third-party communication platform are presented with metadata associated with the photograph through the hyperlink.

5. The method of claim 4 wherein the metadata associated with the photograph comprises at least one of a GPS coordinate, a geographic location, a date, a time, and an Exif tag.

6. The method of claim 1 wherein the trusted communication platform is at least one of a short-messaging-service, a website, a mobile application, and an online social network.

7. A computer server comprising: a processor and a memory having non-transitory instructions stored thereon that when executed cause the computer server to:
   generate a trusted image based on a captured image provided by a user so that the captured image is referenceable through a unique identifier in case of post-modification by other users of an external website using the processor and the memory of the computer server;
   generate a watermark applicable to the captured image;
   append the watermark and a unique identifier to the captured image; and
   automatically post the trusted image to the external website;
   associate a caption posted by at least one of the user and other users of the external website with at least one of the captured image and the trusted image;
   generate a hashtag related to the caption posted by the user with at least one of the captured image and the trusted image;
   apply the hashtag to the caption posted by the user with at least one of the captured image and the trusted image;
   automatically hash-tagging each subsequent caption added to the trusted image in the external website;
   generating a hyperlink to the captured image when the trusted image is displayed on the external website to users of the external website; and permitting users of the external website viewing the trusted image to compare a current display of the trusted image in the external website with the captured image through the hyperlink, wherein the current display is at least one of a derivative image of the trusted image, an alteration of the trusted image, a transformation of the trusted image, and a duplication of the trusted image, wherein the captured image is remotely stored on a storage device associated with the computer server, and wherein the external website is at least one of a short-messaging-service and an online social network.

8. The computer server of claim 7 further comprising:
authenticate the user in a watermarking application of a mobile device as the user of the external website,
execute a video sequence when the user is determined to be unfamiliar with the watermarking application,
determine that the captured image is taken using at least of a front camera and a back camera of the mobile device, and
assign the unique identifier to the captured image.

9. The computer server of claim 8 wherein the trusted image posted to the external website to appear along with the watermark and the unique identifier.

10. The computer server of claim 7 further comprising presenting users of the external website with metadata associated with the captured image through the hyperlink.

11. The computer server of claim 10 wherein the metadata associated with the captured image comprises at least one of a GPS coordinate, a geographic location, a date, a time, and an Exif tag.

12. A method of a watermarking server comprising:
assigning a unique identifier to a photograph;
generating a trusted image based on the photograph so that the photograph is referenceable through the unique identifier in case of post-modification by users of a trusted third-party communication platform using a processor and a memory of the watermarking server;
generating a watermark applicable to the photograph;
appending the watermark and the unique identifier to the photograph; and
automatically posting the trusted image to the trusted third-party communication platform;
automatically hash-tagging a caption added to the trusted image in the trusted third-party communication platform;
generating a hyperlink to the photograph when the trusted image is displayed on the trusted third-party communication platform to users of the trusted third-party communication platform;
permitting users of the third-party communication platform viewing the trusted image to compare a current display of the trusted image in the third-party communication platform with the photograph through the hyperlink,
wherein the current display is at least one of a derivative image of the trusted image, an alteration of the trusted image, a transformation of the trusted image, and a duplication of the trusted image, and
wherein the photograph is remotely stored on a storage device associated with the watermarking server.

13. The method of claim 12 further comprising:
authenticating a user in a watermarking application of a mobile device as the user of the trusted third-party communication platform;
executing a video sequence when the user is determined to be unfamiliar with the watermarking application;
determining that the photograph is captured using at least of a front camera and a back camera of the mobile device;
associating the caption posted by at least one of the user and other users of the trusted third-party communication platform with at least one of the photograph and the trusted image;
generating a hashtag related to the caption posted by the user with at least one of the photograph and the trusted image; and
applying the hashtag to the caption posted by the user with at least one of the photograph and the trusted image.

14. The method of claim 13 wherein the trusted image posted in the trusted third-party communication platform to appear along with the watermark and the unique identifier.

15. The method of claim 12 wherein users of the third-party communication platform are presented with metadata associated with the photograph through the hyperlink.

16. The method of claim 15 wherein the metadata associated with the photograph comprises at least one of a GPS coordinate, a geographic location, a date, a time, and an Exif tag.

17. The method of claim 16 wherein the trusted communication platform is at least one of a short-messaging-service and an online social network.

* * * * *